Feb. 22, 1949.   R. C. JOHNSON   2,462,198
THERMOSTATIC VALVE
Original Filed July 1, 1940   3 Sheets-Sheet 1

Inventor:
Roger C. Johnson

Feb. 22, 1949. R. C. JOHNSON 2,462,198
THERMOSTATIC VALVE
Original Filed July 1, 1940 3 Sheets-Sheet 2

Inventor:
Roger C. Johnson.
By Brown, Jackson, Boettcher & Dienner
Attys.

Feb. 22, 1949.   R. C. JOHNSON   2,462,198
THERMOSTATIC VALVE
Original Filed July 1, 1940   3 Sheets-Sheet 3

INVENTOR.
Roger C. Johnson

Patented Feb. 22, 1949

2,462,198

UNITED STATES PATENT OFFICE 2,462,198

THERMOSTATIC VALVE

Roger C. Johnson, Moline, Ill.

Original application July 1, 1940, Serial No. 343,479. Divided and this application April 1, 1944, Serial No. 529,139

20 Claims. (Cl. 236—34)

This application is a division of my co-pending application, Ser. No. 343,479, filed July 1, 1940, now Patent 2,352,203, dated June 27, 1944.

The present invention relates to thermostatic valves and more particularly to thermostatic valve units adapted to be inserted or embodied in the water line of an automobile cooling system to control the flow of the cooling medium through the automobile engine in accordance with the temperature of the cooling medium.

Heretofore thermostatic units, both the bi-metallic and the expansible bellows type, have been of such construction that either the thermostatic element, the valve closure, or the operating mechanism offered considerable obstruction to the free flow of the cooling medium through the unit, even with the valve wide open, as under conditions of high temperature. One way to overcome this tendency to restrict the flow of cooling medium at times when no restriction should exist was to enlarge the conduit passage at the thermostatic valve unit so as to provide an effective water passage section that is substantially equal in area to the section at any point in the system. However, it is not always feasible to employ units having enlarged sections, as in the case of hose-line thermostats, for example, in which the unit is simply slipped into one of the radiator hose connections.

The principal object of the present invention is the provision of a thermostatically controlled valve unit in which, without requiring an enlarged casing, the thermostatic element, the valve closure itself, and the operating connection therebetween are so constructed that when the valve is open there is very little obstruction to the free flow of the cooling medium through the system. More specifically, it is an object of this invention, first, to employ a coiled bi-metallic thermostat and dispose the same axially in the water line so that the coils of the thermal element will be disposed edgewise to the flow of water or other cooling medium and therefore offer a minimum resistance to the flow; second, to employ a valve of the butterfly or similar type which, when open, is arranged edgewise of the conduit and hence offers a minimum resistance of flow; and, third, to provide a simple, direct operating connection, also arranged axially, between the axially disposed coil and the valve and which therefore also offers only a minimum resistance to the fluid flow through the unit.

Another object of the invention is the provision of a thermostatic unit of this character in which the outer end of the axially arranged bi-metallic thermostatic coil is fixed to the casing by a simple connection that does not restrict flow, and in which the inner end of the coil is connected, without levers, pivots, or other parts that have to be connected to or anchored on the casing, by a direct acting part to the valve which the thermostatic coil controls. Still further, another object of this invention is to provide a thermostat of the hose-line type in which an axially arranged bi-metallic coil or similar thermostatic element is connected only to the casing and the pivoted valve which the coil controls.

Another very important feature of this invention is the provision of a thermostatic valve in which for given increments of displacement of the thermal element the initial opening movement of the valve is at a slow rate which, however, increases at an accelerated rate as the valve approaches its full open poistion. This is especially advantageous when the thermal element is a bi-metallic member, in which the power available for any given temperature change is limited. Moreover, when the flow controlling valve is in its closed position it is subjected to considerable pressure from the water pump. Also, when operating under conditions of low outside air conditions, as near or below 0° F., it takes only a very small opening of the valve to provide all the circulation needed. With these conditions in mind it is a feature of the invention to provide connections between the valve and the thermal element which provide a slow opening valve at times when power and/or accurate control is needed, but in which after the valve has been moved only a relatively small distance away from its fully closed position the movement of the valve becomes increasingly greater as the valve approaches its fully open position. Thus, small movement and relatively great power are available when they are needed, but without interfering with the full opening of the valve within a given temperature range.

According to the present invention, the connections by which the above advantages are realized may take several forms, some particularly concerned with the so-called axial placement of the bi-metallic element, and some adapted to be used with conventionally mounted thermostats, with the coils transverse in the casing.

Another feature of this invention is to provide a connection between the valve and the thermal element arranged so that the connection lies substantially flat against the valve when the latter is in its open position, whereby to secure as little obstruction to fluid flow as possible. This is particularly important where the thermostatic coil is arranged axially, in which a free flow when the valve is wide open is realized, but it is also important in securing an initial slow and powerful movement of the valve starting from its closed position, followed by a movement of the valve which is actually proportionately greater than the movement of the thermal element. Stated in another way, it is a feature of this invention to provide a valve opened and closed by a thermal element in which at first the valve moves much slower than the thermal element and then later moves appreciably faster than the thermal element. Still further, another object of this invention is to secure this action with only a single movable element between the thermally moved part and the valve.

These and other objects and advantages of the present invention will be apparent to those skilled in the art after a consideration of the following detailed description of the preferred embodiments, in which the principles of the present invention have been incorporated, taken in conjunction with the accompanying drawings.

In the drawings:

Figure 14 is a perspective view of another modified form;

Referring now more particularly to Figures 1 to 4, inclusive, the casing or conduit through which the flow of fluid to be controlled passes is indicated by the reference numeral 10. For a hoseline thermostat, with which the present invention is principally concerned but which is not necessarily limited thereto, the casing 10 may be a cylindrical member adapted to be slipped into the radiator hose connection between the water jacket of an automobile motor and the radiator. Flow through the casing 10 is controlled by valve means which includes a transverse shaft 12 that is mounted for rocking movement in suitable holes disposed substantially at diametrically opposite points in the casing 10 and valve plate or disc 13 that is fixedly secured to the shaft 12 by any suitable means, such as screws 14. When the valve disc or closure 13 is secured to the shaft 12, the latter is held in proper position in the casing 10 against any axial displacement. The valve disc 13 is so shaped that when the valve is in the position shown in Figure 1, making an oblique angle with respect to the axis of the casing 10, the fluid flow through the casing is cut off.

The valve 13 is controlled by a thermostatic coil 17, which may be a bi-metallic element, that is disposed wholly within the casing 10 and has its coils disposed axially with respect to the axis of the casing 10. With the coils arranged in this manner, that is, edgewise with respect to the fluid flow through the casing, the disposition of the thermal element within the casing does not offer any great restriction to the fluid flow, yet the thermal element is nevertheless in very intimate thermal contact with the fluid in the casing. The outer end 18 of the coil 17 is fixed in any suitable manner, as by a rivet 19, to the casing 10.

In order to provide for easy pivotal movement of the valve 13, the shaft is provided with trunnion sections 21 and 22, and according to the present invention the pivotal movement of the valve 12 is controlled by the thermostat 17 through a direct-acting connection that requires no levers, fixed anchors, pivots, or the like.

Figure 2:
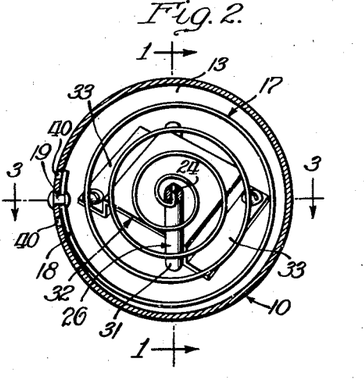
Figure 2 is a view taken along the line 2—2 of Figure 1.
Figures 5, 10:
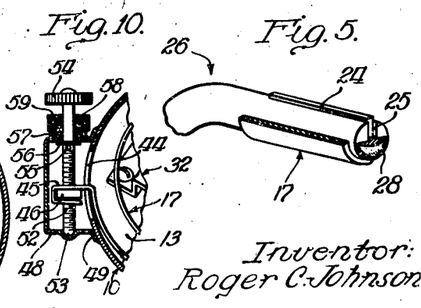
Figure 5 is an enlarged fragmentary view showing one manner of attaching the inner end of the axially arranged thermostat to the valve-actuating member.
Figure 10 is a sectional view illustrating one form of adjusting means by which the opening and closing temperatures of the unit may be manually adjusted at any time.
Figure 6:
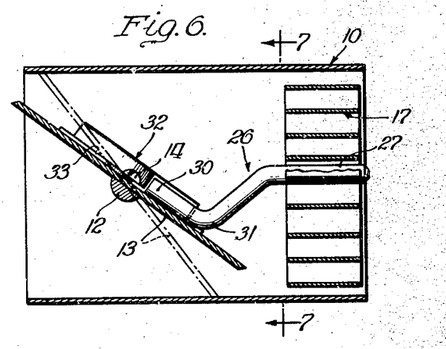
Figure 6 is a section similar to Figure 1 showing the position of the valve when the thermostat has been moved approximately through half its total range of movement.

As best shown in Figures 2 and 5, the inner end of the thermostatic coil 17 is bent, as at 24, to enter a groove or slot 25 formed in the adjacent end of an operating member 26 that extends generally axially of the casing 10 directly between the thermostatic coil 17 and the valve 13 and which is adapted to rock about an axis that substantially coincides with the axis of the casing 10. After the end 24 of the coil 17 has been inserted into the slot 25 in the end section 27 of the rockable member 26 it may be permanently secured therein, as by a drop of solder 28 or any other suitable means.

Figure 1:
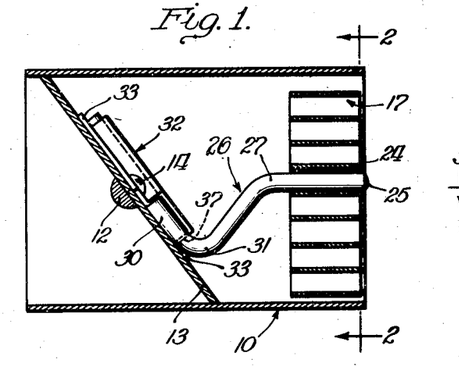
Figure 1 is a longitudinal section taken through a hose-line thermostatic valve constructed according to the principles of the present invention.

The connecting or operating member 26 has an angled valve operating section 30, the heel portion 31 of which is connected by an intermediate bent section to the end 27 that is fixed as aforesaid to the thermostatic coil 17. The angled section 30 is received within a relatively flat bracket 32 which has flanges 33 and a central portion that is spaced from but generally parallel to the valve 13. As best shown in Figure 1, the spacing of the central portion of the bracket 32 is substantially the same as the diameter of the section 30 of the member 26, but the section 30 of the member 26 is freely movable within the slot that is formed by the bracket 32 and the valve 13. The flanges 33 are apertured to receive the screws 14, so that when the latter are driven tight to fasten the valve 13 to the shaft 12 the bracket 32 is at the same time securely and permanently fixed in position.

Figure 3:
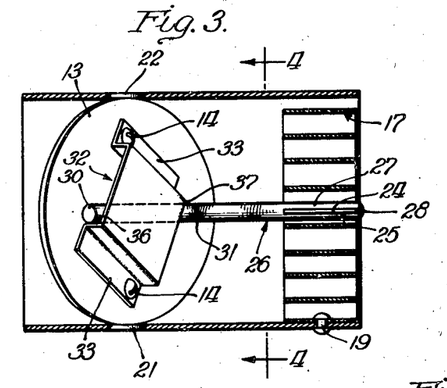
Figure 3 is a section taken along the line 3—3 of Figure 2.

The position of the bracket 32 on the valve 13 is such that when the temperature of the coil 17 is at or below the point where it is desired to have the fluid flow through the casing cut off, the edges 36 and 37 (Figure 3) of the slot defined by the bracket 32 engage the bent or angled section 30 of the member 26 on both sides of its axis of rocking movement, as defined by the end 27 to which the coil 17 is fixed, and hold the member 26 in a position in which the plane containing the member 26 is normal to the pivot axis of the valve 13, as indicated in Figures 1, 2 and 3.

The assembly of the thermostatic unit shown in Figures 1 to 9 involves only simple operations. After the valve disc 13 and bracket 32 are attached to the shaft 12 and the coil 17 is fixed to the member 26, as at 28, all that is necessary to do to complete the assembly is to insert the end 30 of the member 26 into the bracket 32 and then insert the rivet 19 in the opening 40 that disposes the parts in the proper relative positions. It is not necessary to fasten the end 30 or secure it in any manner to the valve other than by inserting it under the bracket 32.

Figure 7:
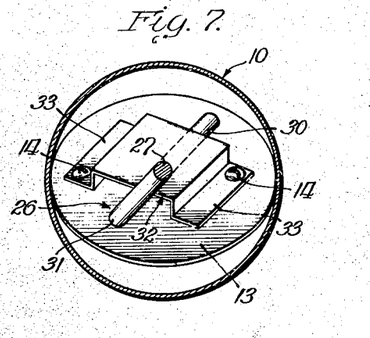
Figure 7 is a view taken along the line 7—7 of Figure 6.
Figure 8:
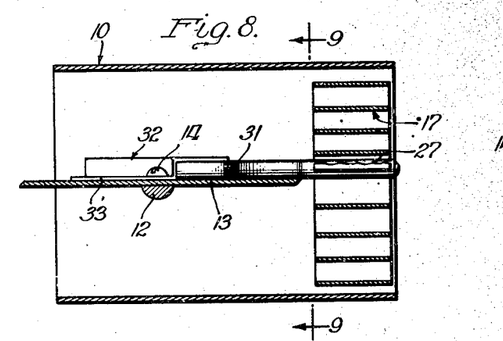
Figures 8 and 9 are views showing the valve in its wide open position with practically free fluid flow through the unit, Figure 9 being a section taken along the line 9—9 of Figure 8.
Figure 9:
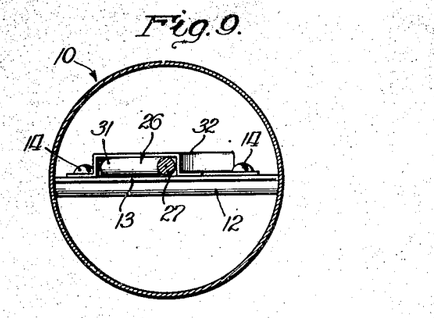

In operation, the bracket edges 36 and 37 prevent the construction of the coil under conditions of low temperature from rocking the member 26 in a counterclockwise direction (Figure 2) beyond the position shown, thereby positively holding the valve 13 closed. When embodied in an automobile cooling system this provides for a quick warm-up when starting in cold weather. As the temperature of the cooling medium or other fluid the temperature of which is imposed on the thermostatic coil rises, the coil warms and expands, thereby rocking the member 26 in a clockwise direction as viewed in Figures 2 and 4. Due to the fact that the flat bracket 32 holds the valve 13 against the end 30 at all times, the planes of these two parts are always maintained generally parallel, and since the valve is constrained in its movement to a pivotal motion about the axis defined by the shaft 12, as the member 26 rocks clockwise toward the position shown in Figure 7 the valve 13 is rocked from its closed position (dotted line in Figure 6) to a slightly opened position (full lines in Figure 6). As the temperature of the fluid continues to rise, the coil 17 expands further, finally swinging the member into a flat position which, of course, shifts the valve into a corresponding position, as best shown in Figures 8 and 9. Any tendency for the thermostat 17 to uncoil further and continue to rock the member 26 in a clockwise direction beyond the flat position shown in Figure 9 is prevented by the engagement of the adjacent position of the valve 13 directly with the heel portion 31 of the member 26, as shown in Figure 8.

It will be seen from these Figures 8 and 9 that both the valve 13 and the member 26 are disposed in an axially extended position within the casing, which is a position in which these parts offer the least resistance to fluid flow past them, and as pointed out above, the axial or edgewise position of the thermostatic coil 17 is one in which the coil also offers the least resistance to fluid flow. Thus, according to the present invention, I have provided a thermostatically controlled valve in which all parts are disposed within the confines of the casing through which the fluid controlled passes, yet when the valve is open to allow a full flow, the valve and other controlling parts do not materially obstruct the full flow desired.

As mentioned above the plurality of openings in the casing 10 makes it possible to place the rivet or other part that fixes the outer end of the coil 17 in the right position to take care of manufacturing or other variations, and if a screw instead of a rivet is used, the user may, before inserting the unit in the hose line, place the screw in the hole to give the desired operation. For units which are to have an adjusting means that is accessible at all times, such as those to be inserted between two sections of hose connection or in some similar situation, the exterior adjustment shown in Figure 10 may be used. In Figure 10, the casing 10 is shown as provided with a slot or opening 44 through which an extended end 45 of the thermostatic element 17 projects. The end 45 is formed to embrace a nut member 46. A housing 48 is provided flanges 49 and is soldered or otherwise secured over the opening 44 and embraces the extended end 45 of the element 17. The housing 48 receives an adjusting screw 52 which has one end 53 seated in a recess formed in one wall of the housing 48. The other end of the adjusting screw extends through an opening in the wall opposite the recess at 53 and receives a thumb piece 54 suitably fixed thereto. In assembly the screw 52 is inserted into the housing 48 and threaded to the desired extent into the nut 46. A pin 55 is then inserted in an opening in the adjusting screw 52 so as to keep the same in position. If desired, a thrust washer 56 may be provided. Preferably, the housing carries a collar 57 which surrounds the extended portion of the screw 52, and suitable packing 58 is disposed within the collar and held in leaktight relation about the end of the screw 52 by a packing gland 59. As is obvious, turning the thumb piece 54 moves the outer end of the thermostatic element 17 in one direction or the other, thereby adjusting the opening and closing points of the valve.

Figure 4:
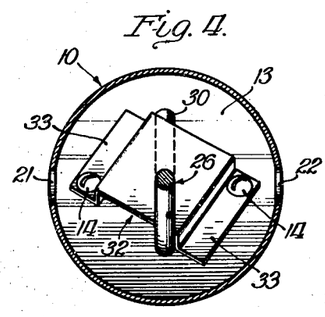
Figure 4 is a transverse section taken along the line 4—4 of Figure 3.
Figure 11:
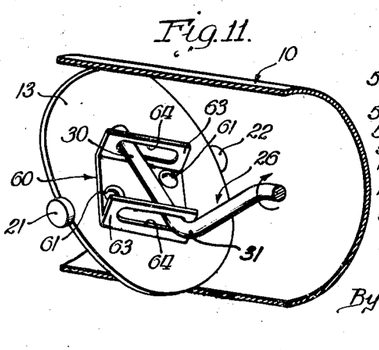
Figures 11 and 12 are perspective views illustrating modified forms of the present invention.

Figure 11 is an illustration of a slightly different form of bracket connecting the operating rod 26 to the valve. In this form of the invention the bracket 60 consists of a U-shaped member connected by the screws 61 that also secure the valve disc to its pivot shaft. The bracket 60 has upturned sections 63 which are provided with slots 64 to receive the end 30 of the member 26. Figure 11 shows the parts in the positions they occupy when the valve 13 is held closed, the member 26 occupying the same position as is illustrated in Figures 2 and 4. When the temperature rises the thermostatic coil will expand and swing the member 26 in the direction indicated by the arrow, but the engagement of the section 30 with the ends of the slots 64 effectively prevents the contraction of the thermostat from rocking the member 26 backwardly any farther than is indicated in Figure 11.

Figure 12:
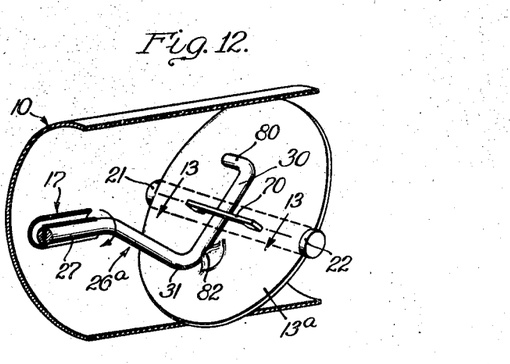
Figure 13:
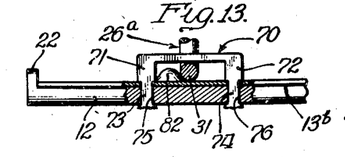
Figure 13 is a section taken along the line 13—13 of Figure 12.

Figures 12 and 13 illustrate a simplified form of the invention in which a valve disc 13a is fixed to its pivot shaft 12 by means of a U-shaped clip 70 having arms 71 and 72 which embrace the end 30 of the operating member 26 and have reduced extensions 73 and 74 which are inserted through openings 75 and 76 which are formed in the shaft 12 and registering holes in the body of the valve disc 13a. When the ends 73 and 74 are riveted over, as shown in Figure 13, the clip 70 is rigidly fixed in position and the shoulders at the junction of the extensions 73 and 74 with the main portions of the arms 71 and 72 hold the valve disc firmly to the shaft 12.

In this form of the invention the member 26 is prevented from being rocked in a direction opposite to the arrow shown in Figure 12 past the closed position of the valve by an angled end 80 formed on the end of the section 30 of the member 26, and also by the engagement of the heel 31 of the member 26 with a protuberance 82 formed on the valve disc. As will be clear from Figure 12, the member 26 may be turned by the thermostat in the direction of the arrow to open the valve, but the end 80 and the protuberance 82, or either of them, will prevent the rotation of the member 26 in a direction opposite to the arrow shown in Figure 12, so that even though the temperature to which the thermostat 17 is subjected should fall below the temperature at which it is desired to have the valve 13 close, the member 26 cannot be rocked away from the position shown in Figure 12 holding the valve closed. It is not necessary to provide both the end 80 and the protuberance 82, as either is effective to prevent undesired backward movement of the member 26. It will also be noted that the construction shown in Figures 11, 12 and 13 offers even less obstruction to the free flow of fluid through the casing than the form shown in Figures 1 to 8.

Figure 14 shows another simplified form of the invention. In this form the valve disc 13b is provided with slits defining a pair of end sections 91 that are deflected from the general plans of the valve opposite the central section 92. These sections 91 and 92 are for the purpose of receiving a shaft 93 upon which the valve is mounted. If desired the valve may pivot on the shaft 93, in which case the latter may have its ends soldered or otherwise fixed to the casing 10 in leaktight relation. This is, however, not necessary for hose-line installation since the hose itself will not only prevent leakage but may be relied upon to keep the shaft 93 in the casing 10. It is therefore possible, if desired, to solder or otherwise fix the valve 13b to the shaft 93, say at the slits forming the sections 91 and 92, whereby these positions will be closed. These portions need not be closed, however, since a limited amount of leakage past the valve in its closed position is not objectionable.

To secure an operating connection between the section 30 of the member 26 and the flow-controlling valve in this form of the invention a U-shaped clip 96 is fastened in any suitable manner to the valve 13b in the angular relation shown, with the section 30 engaging opposite ends of the member 96 when the valve is in its closed position so that further contraction of the thermostat will not swing the valve open. The clip is so disposed, however, that the member 26 can rock freely in the direction of the arrow to open the valve. To reduce the friction of the end 30 against the valve disc 13b, the latter may carry raised generally circular ridges or sections 97 and 98 which may be stamped or otherwise formed in the body of the valve disc and disposed in the path of movement of the end portions of the section 30. This feature may also be adopted for the form shown in Figures 1 and 12, if desired. In Figure 11 the edges of the slots 64 offer minimum frictional resistance to the rocking movement of the member 26.

One advantage present in all of the embodiments described above is that by arranging the member 26 at the valve end thereof so that one portion acts against the valve at one side of the pivot axis thereof while another portion acts on the valve at the other side of the pivot axis, a simple rocking movement of the member 26 opens and closes the valve without any other levers, links or other extraneous parts. Also, it permits the axial disposition of the thermostatic coil while retaining the advantages of a direct and positive actuating connection for the valve.

Another advantage present in the several illustrated forms of the instant invention is that the initial movement of the thermostatically controlled member 26 as the coil expands, occasions at first only a small opening movement of the valve, thus providing in effect a relatively powerful initial opening movement. Also, the connection is substantially irreversible when the valve is closed, which means that pressure against the valve does not have to be sustained by the thermostat coil. Figure 7 shows the position of the member 26 after it has been turned through approximately the first half of its range of opening movement, but it will be observed from Figure 6 that the corresponding movement of the valve is proportionately much smaller. The remaining movement of the member 26 toward the open position imparts an accelerated movement to the valve 13, rapidly completing the opening of the valve. As in all of the embodiments illustrated, where the valve operating member is rocked through approximately 90°, the opening movement of the valve 13 varies approximately as the verse sine, or 1 minus the cosine, of the angle of movement of the member 26 away from the closed valve position (Figures 2 and 4). As a matter of fact, the initially slow opening movement and the subsequently accelerated movement of the valve is somewhat in excess of the above indicated ratio, since at first the angled section of the operating member 26 acts against the valve at an effective distance from the axis of the valve that is greatest when the latter is in its closed position and progressively decreases as the valve approaches its open position, as will be clear from Figure 14. Thus, with uniform expansion of the thermostatic coil the valve is opened very slowly at first and then at a rapidly increased rate of the valve moves away from its closed position. It is not necessary, however, to have the member 26 move through 90° in shifting the valve from its closed position to its wide open position, or to have the member 26 start opening the valve with the section 30 in a vertical plane (Figures 2 and 4). By selecting the proper angle for the section 30, almost any desired range of movement of the member 26 less than 90° can be obtained. However, if the member 26 is arranged to start opening the valve in a position where the section 30 does not lie in a plane that is normal to the axis of the valve shaft (12, 22, or 93), but instead is arranged to start opening the valve when it is in a laterally tilted position, as for example in the position shown in Figure 7, then the advantage of opening the valve at an initially slow rate is, to a considerable extent, lost. Figures 15 to 18 show a form of the invention in which, with all the advantages of an axially arranged thermostat, the latter need move through a range of only 45° from closed to opened position of the valve.

Referring now to Figures 15 to 18, inclusive, flow through the casing or tube 100 is controlled by valve means which includes a shaft member 101 and a butterfly valve vane 102. The casing or tube 101 is apertured at opposite sides to receive the shaft 101 upon which the butterfly valve or vane 102 is pivoted. To this end, ears 103 are struck up from the plane of the valve and are apertured to receive the shaft 101. The latter is provided with a cross bore 106 which extends in an axial direction relative to the casing and is held in that position, as will be explained below.

Figure 19:
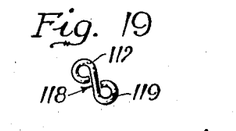
Figure 19 is a fragmentary view of the connecting link shown in Figures 15-18.

A thermostat 110, preferably in the form of a temperature responsive bi-metallic element similar to the thermostat 17 described above, has its radially outer end (not shown) fixed to the casing 100 in any suitable manner, such as is shown in Figure 2 or Figure 10. The radially inner end of the thermostat 110 is fixed, as by soldering, in the slotted end of an operating member in the form of a shaft 111 that is disposed in the casing 100 generally axially thereof. The opposite or inner end of the shaft 111 carries or is formed with a pin 112 which is journaled in the bore 106 in the shaft 101. An arm 115 is fixed to the shaft 111 in any suitable manner near the valve 102 and has its outer end 116 connected to one end 117 of a link 118, best shown in Figure 19. The other end 119 of the link 118 is connected to a bracket 121 which is fixed to the valve 102 by riveting as shown in Figure 15, or in any other suitable manner.

Figure 15:
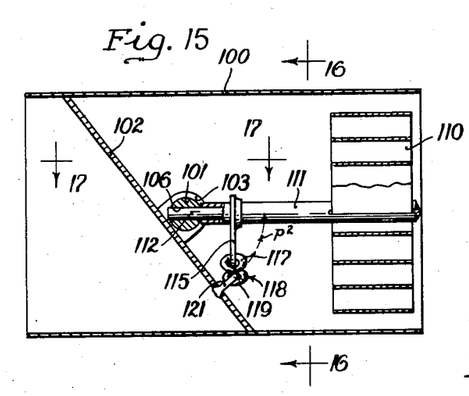
Figure 15 is a longitudinal section taken through another modified form of the present invention, embodying an axial thermostatic coil and an arm and link connection between the thermostat and the valve.
Figure 16:
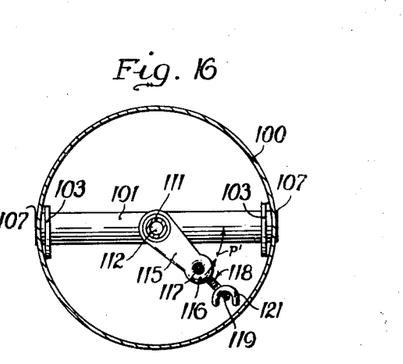
Figure 16 is a section taken along the line 16—16 of Figure 15.
Figure 17:
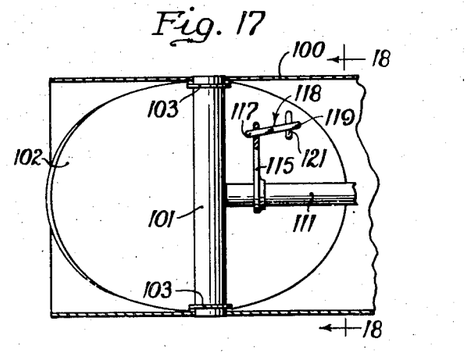
Figure 17 is a view taken generally along the line 17—17 of Figure 15, but with the valve in wide open position.
Figure 18:
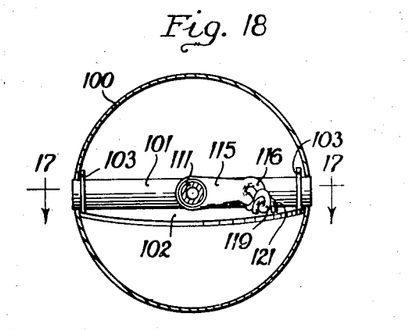
Figure 18 is a section taken along the line 18—18 of Figure 17.

When the valve is closed, as shown in Figures 15 and 16, the thermostatically controlled arm 115 and the connecting link 118 are disposed in straight line relation (Figure 16). In operation, assuming that the unit is installed in place in an automobile cooling system and the temperature thereof is rising, as the thermostatic coil 110 expands the shaft 111 and the arm are rocked or rotated in a counterclockwise direction (Figure 16), the end 116 of the arm 115 which is received in the end 117 of the link 118 moving through an arcuate path, as indicated at $p^1$ in Figure 16. As will be clear from Figure 15, the path of movement $p^1$ lies in a plane transverse with respect to the casing 100. The bracket 121, fixed to and movable with the valve 102, is constrained to move in an arcuate path $p^2$ (Figure 15) which lies in a vertical plane that extends longitudinally of the casing. The paths $p^1$ and $p^2$ may therefore be said to be divergent, it being noted that in the cold or closed position of the valve the bracket 121 is disposed generally in the transverse plane of the arm 115 and the path $p^1$ but moves away from such plane as the valve opens. In the initial opening movement of the valve, its movement is at a very slow rate. This is due to the straight line relation between the arm 115 and the link 118, as shown in Figure 16, when the valve 102 is in its closed position. However, as the thermostatic element 110 continues to expand and swing the arm along the path $p^1$ the opening movement of the valve is rapidly accelerated, due to the fact that the bracket 121, to which the lower end 119 of the link 118 is connected, is constrained to move outwardly along the path $p^2$. Preferably, the parts are so arranged so that when the valve 102 reaches its open position, the paths $p^1$ and $p^2$ are separated by a distance which is substantially equal to the effective length of the link 118. Thus, the latter and the arm 115 lie substantially flat against the valve 102 in its open position and the arm 115 is not required to move any farther than into this position in order to swing the valve 102 all the way from its closed position to its open position. Also, having both elements 115 and 118 flat against the valve when in its wide open position disposes the parts in a position in which they do not materially interfere with a free fluid flow through the casing. Since the initial opening movements of the valve are relatively small, the thermostatic element is able to exert a powerful action against the valve when the latter is closed or nearly so. This provides a very accurate control at the lower temperatures, when accurate control is very desirable, and a relatively rapid movement of the valve after the latter has started to open, when fluid pressure against the valve is largely relieved and a powerful action is not essential. The valve 102 is prevented from moving beyond its open position, even though temperatures continue to rise, by virtue of its contact with the hub end of the arm 115. Preferably, the shaft 101 is soldered at its ends to the casing 100 after all of the parts have been assembled. This holds the end 112 of the shaft 111 in the proper position in the casing 100.

While I have shown and described above the preferred means in which the principles of the present invention have been embodied, it is to be understood that my invention is not to be limited to the particular details shown and described above, but that, in fact, widely different means may be employed in the practice of the broader aspects of my invention.

What I claim and desire to secure by Letters Patent is:

1. A thermostatically controlled valve unit comprising a casing, a valve of a butterfly type pivotally mounted therein to control the fluid flow therethrough, a thermostatic coil axially arranged in said casing, an axially extending member fixed at one to said coil to be rotated thereby, said member having an angled section at the other end extending generally parallel to the face of the valve, and a member fixed rigidly to said valve and having means serving as a narrow slot receiving said angled section for causing said valve to pivot about its axis as the axially extending member is rocked about its axis.

2. A valve comprising a valve closure pivoted for swinging movement about an axis, an operating member disposed for rocking movement about an axis disposed generally at a right angle with respect to the pivot axis of said valve closure and having an angularly disposed section at one end extending generally parallel to the face of said valve closure, a generally U-shaped member embracing said section and fixed to said valve closure so that said valve closure will be rocked about its axis when the operating member is rocked about its axis, and means for rocking said operating member.

3. A thermostatically controlled valve unit comprising a casing, a coiled bi-metallic thermostat arranged in said casing with its axis substantially coinciding with the axis of the casing, whereby the convolutions of the thermostat are disposed edgewise with respect to the flow through the casing and offer substantially no resistance to said flow, a valve pivotally mounted in said casing and swingable about a transverse pivot axis from a position extending across said casing to a position extending axially of said casing, a rotatable member disposed generally axially of said casing and having an angled section at one end, means connecting the other end of said member to the inner end of said coiled thermostat, means for holding said valve substantially flat against the angled section of said rotatable member in various positions of the latter, and means preventing the contraction of said thermostat from rotating said rotatable member past the closed position of the valve, said valve engaging the rotatable member in the open position of the valve.

4. A thermostatically controlled valve unit comprising a casing, a valve of the butterfly type pivotally mounted therein to control fluid flow therethrough, a thermostatic coil axially arranged in said casing, an operating member arranged for rocking movement about an axis generally at right angles to said pivot axis and connected with said valve closure to cause the latter to pivot about its axis as the rocking member is rocked about its axis, and means on the valve closure and engageable with the operating member for limiting the movement of the valve closure.

5. A hose line thermostat for automobile cooling systems, comprising a casing adapted to be disposed within the hose line, a coiled thermostatic element disposed in said casing so that its inner end is movable about an axis that substantially coincides with the longitudinal axis of the casing, means fixing the outer end of said coiled thermostatic element to said casing, a valve closure pivotally mounted in said casing for swinging movement about a transverse axis which the axis of the inner end of the said thermostatic coil substantially intersects and with respect to which said last-named axis is disposed at substantially a right angle, a shaft having one end fixed to the inner end of said coil to be rotated thereby and the other end formed with an angled section extending substantially parallel to the face of the valve closure, and a part fixed to said valve closure at the side of its transverse pivot axis adjacent said angled section for receiving the latter and causing movement of the inner end of said coil about its axis to turn the valve closure about its transverse axis from a position across said casing at an oblique angle corresponding to the angle of said section to shut off the flow through the casing to a position generally axially thereof, whereby substantially unobstructed flow is secured.

6. A hose line thermostat as defined in claim 5, further characterized by said valve closure having parts projecting from the plane thereof against which said angled section is adapted to bear, and means for holding said section against said parts.

7. A hose line thermostat as defined in claim 5, further characterized by a generally U-shaped member embracing said angled section and fixed to said valve closure for holding the latter and said angled section in contact.

8. A thermostatic valve comprising a casing, a valve therefor, a shaft disposed transversely of the casing and defining the pivot axis of the valve, a coiled thermostatic element axially arranged in and connected at its outer end to said casing, an operating member extending generally axially of the casing and having one end connected to the inner end of said element, the other end of said member having an angularly bent section, a part disposed at one side of the valve and embracing said section for causing rotation of said member about its axis to swing said valve about its axis, and means extending through said part, valve and shaft for fastening the part to the valve and the latter to the shaft.

9. A hose line thermostat for automobile cooling systems and the like, comprising a casing adapted to be disposed within the hose line, a coiled thermostatic element disposed in said casing so that its inner end is movable about an axis that substantially coincides with the longitudinal axis of the casing, means fixing the outer end of said coiled thermostatic element to the casing, a valve closure mounted for swinging movement in said casing about a transverse axis which the axis of the inner end of the thermostatic element substantially intersects and with respect to which said last-named axis is disposed at substantially a right angle, means serving as a shaft having one end connected with the inner end of said element to be rotated thereby and an angled section at the other end extending substantially parallel to the face of the valve closure, and a part connected with the valve closure at the side of its transverse axis adjacent said angled section for receiving the latter and causing movement of the inner end of said thermostatic element about its axis to turn the valve closure about its transverse axis from a position across said casing at an oblique angle to a position generally axially thereof, whereby substantially unobstructed flow is secured.

10. A thermostat comprising a casing, a valve pivotally mounted therein for movement from open to closed position, a temperature responsive element, a connection between said element and said valve whereby a uniform movement of said temperature responsive element causes a movement of the valve, as it moves away from its fully closed position, that is relatively slower than the movement of said element and, as the valve moves toward its fully open position, a movement of the valve that is relatively more rapid than the movement of said temperature element, and cooperating means on the valve and said connection adapted to contact and prevent contraction of said temperature responsive element from opening the valve.

11. A thermostatic valve unit comprising a casing, a valve mounted for pivotal movement therein about a transverse axis from an oblique position shutting off flow of fluid through the casing to a position substantially axially thereof providing for substantially free flow therethrough, a thermostatically controlled valve operating member having an end movable generally in an arcuate path adjacent the valve lying in a plane transversely of said casing and intersecting the valve at a point spaced from said axis, and a link connecting the movable end of said member with a part on the valve spaced from its axis, said valve and valve operating member being disposed spatially so that said member and said link lie in extended straight line relation substantially in said plane when the valve is closed, the path of movement of said valve part lying in a plane extending generally longitudinally of said casing normal to said first plane and to said transverse valve axis, the length of said link being such that when the valve is disposed in an open position axially of the casing, said valve part and the movable end of said member lie in a plane generally axially of the casing alongside the plane of said valve when open, with said valve part disposed outwardly of the movable end of said member a distance substantially equal to the effective length of said link.

12. A thermostatic valve unit comprising means serving as a valve seat through which fluid to be controlled is adapted to flow, a valve supporting member extending transversely of said seat, a valve of the butterfly type supported on said member for movement from closed to open positions, a thermally responsive member anchored at one end, an operating member extending generally axially of said valve seat and rockable about the axis of said valve seat, which axis extends generally perpendicularly with respect to the axis of movement of said valve, one end portion of said operating member being connected with the other end of said thermally responsive member, means whereby the other end of said operating member is rockably supported on said valve supporting member, and means operatively connecting said operating member with said valve.

13. A thermostatically controlled valve unit comprising a casing, a valve of the butterfly type pivotally mounted therein to control the fluid flow therethrough, a thermostatic coil axially arranged in said casing, an axially extending member disposed generally centrally in said casing and extending longitudinally thereof, a part disposed transversely in said casing and supporting said valve for said pivotal movement in the casing, said part and member extending generally at right angles to one another, means supporting one end of said axially extending member on said part, the other end of said axially extending member being fixed to the inner end of said coil to be rotated thereby, an arm fixed to said axially extending member and extending radially outwardly toward said valve, and a link connecting the outer end of said arm to said valve.

14. In a thermostatic unit adapted to be disposed within a casing to control the flow of fluid therethrough, a valve pivotally mounted therein on a valve supporting member for movement about a transverse axis from a position shutting off flow through the casing to a position generally axially of the casing so as to offer only a small obstruction to fluid flow therethrough, a coiled thermostatic element generally axially arranged in said casing so as to offer only a small obstruction to fluid flow therethrough, a rotatable part disposed in said casing and positioned substantially in and rockable about an axis extending generally centrally and longitudinally of the casing, means connecting one end of said part with said thermostatic element whereby expansion and contraction of the latter rocks said part about said longitudinally extending axis upon the occurrence of a temperature change, the other end being supported on said valve supporting member and having a generally outwardly disposed extension, and means connecting said extension with said valve for swinging the latter about said transverse axis when said rotatable part rocks about said longitudinal axis.

15. A thermostatic valve unit comprising a casing, a valve pivoted therein on a valve supporting member for movement about a transverse axis from a position across said casing shutting off the flow therethrough to a position extending generally axially of the casing and offering minimum resistance to fluid flow through the casing, a coiled thermostatic element the coils of which are axially arranged in and connected at its radially outer end to said casing so as to offer minimum resistance to fluid flow therethrough, means fixing the outer end of said thermostat to said casing, a member disposed generally longitudinally and centrally of said casing, means rockably supporting one end of said member on said valve supporting member, means fixing the other end of said member to the inner end of said thermostatic element so as to be supported thereby, and linkage means operatively connecting the other end of said member with said valve, said linkage means comprising a pair of angularly related parts, one fixed to said member and extending generally radially therefrom and the other connected with said valve, said parts being arranged to lie substantially flat against said valve means, so as to offer only a small obstruction to fluid flow through said casing, said parts being so angularly related, when the valve is in a closed position, so that the initial movements of the part fixed to the thermostatic element causes only a small opening movement of the valve.

16. In a thermostatic unit adapted to be disposed within a casing to control the flow of fluid therethrough, a valve pivotally mounted therein for movement about a transverse axis from a position shutting off flow through the casing to a position generally axially of the casing so as to offer only a small obstruction to fluod flow therethrough, a coiled thermostatic element generally axially arranged in said casing so as to offer only a small obstruction to fluid flow therethrough, a rotatable part disposed in said casing and positioned substantially in and rockable about an axis extending generally centrally and longitudinally of the casing, means connecting one end of said part with said thermostatic element whereby expansion and contraction of the latter rocks said part about said longitudinally extending axis upon the occurrence of a temperature change, means spaced from said element for supporting the other end of said rotatable part in said casing, and means at said other end of said part reacting against said supporting means to cause rocking movement of said part to move said valve from one position to another.

17. A thermostatic valve unit comprising a casing, a valve pivoted therein for movement about a transverse axis from a position across said casing shutting off the flow therethrough to a position extending generally axially of the casing and offering minimum resistance to fluid flow through the casing, a coiled thermostatic element the coils of which are axially arranged in and connected at its radially outer end to said casing so as to offer minimum resistance to fluid flow therethrough, means fixing the outer end of said thermostat to said casing, a member disposed generally longitudinally and centrally of said casing and connected at one end to the inner end of said thermostatic element, and linkage means connecting the other end of said member with said valve, said linkage means comprising a pair of angularly related parts, one connected with said member and movable thereby about an axis and the other connected with said valve, said parts being so angularly related and their lengths being such that said parts lie substantially flat against said valve, when the latter is open, so as to impose only a small obstruction to fluid flow through the casing when the valve is open.

18. A thermostatic valve unit comprising a casing, valve means mounted therein and including a valve member movable from a closed position shutting off flow through said casing to an open position providing for flow therethrough, a thermostatic element in said casing, and means connecting the inner end of the thermostatic element with said valve member to operate the same, comprising a shaft member extending generally longitudinally of the casing generally centrally thereof, means supporting the end of said shaft member opposite said thermostatic element on said valve means, an arm fixed at its inner end to said shaft member adjacent said valve, and a link having a universal connection at its ends with said arm and valve for pivotally connecting the outer end of said arm with said valve and disposed in substantially straight line relation with said valve when said valve is closed, whereby said valve is moved out of its closed position at a slow rate compared with the rate of movement of said thermostatic element, said link being disposed in a position substantially flat against the valve when the latter is open, so that the valve and linkage offer only a small resistance to fluid flow through the casing.

19. In a thermostatic unit adapted to be disposed within a casing to control the flow of fluid therethrough, valve means disposed within said casing and including a supporting member carried by the casing and a valve member pivotally mounted in said casing for movement about a transverse axis from a position shutting off flow through the casing to a position generally axially of the casing so as to offer only a small obstruction to fluid flow therethrough, a coiled thermostatic element generally axially arranged in said casing so as to offer only a small obstruction to fluid flow therethrough, a rotatable part disposed in said casing and positioned substantially in and rockable about an axis extending generally centrally and longitudinally of the casing, means connecting one end of said part with said thermostatic element whereby expansion and contraction of the latter rocks said part about said longitudinally extending axis upon the occurrence of a temperature change, the other end being supported on said valve means and having a generally outwardly disposed extension, and means connecting said extension with said valve member for swinging the latter about said transverse axis when said rotatable part rocks about said longitudinal axis.

20. A thermostatic valve unit comprising a casing, flow controlling valve means therefor including a supporting member carried by the casing and a valve member pivotally mounted in said casing for movement about a transverse axis from a position across said casing shutting off the flow therethrough to a position extending generally axially of the casing and offering minimum resistance to fluid flow through the casing, a coiled thermostatic element the coils of which are axially arranged in and connected at its radially outer end to said casing so as to offer minimum resistance to fluid flow therethrough, means fixing the outer end of said thermostat to said casing, an operating member disposed generally longitudinally and centrally of said casing, means rockably supporting one end of said operating member on said valve means, means fixing the other end of said operating member to the inner end of said thermostatic element so as to be supported thereby, and linkage means operatively connecting the other end of said operating member with said valve member, said linkage means comprising a pair of angularly related parts, one fixed to said operating member and extending generally radially therefrom and the other connected with said valve member, said parts being arranged to lie substantially flat against said valve member, so as to offer only a small obstruction to fluid flow through said casing, said parts being so angularly related, when the valve member is in a closed position, that the initial movements of the part fixed to the thermostatic element causes only a small opening movement of the valve member.

ROGER C. JOHNSON.

REFERENCES CITED

The following references are of record in the file of this patent:

UNITED STATES PATENTS

| Number | Name | Date |
|---|---|---|
| 472,102 | Bradbury | Apr. 5, 1892 |
| 1,761,910 | Eshbaugh | June 3, 1930 |
| 1,806,530 | Giesler | May 19, 1931 |
| 1,819,834 | Bronander | Aug. 18, 1931 |
| 2,007,486 | Trethewey | July 9, 1935 |
| 2,123,979 | Ward | July 19, 1938 |